United States Patent [19]

Tymkewicz

[11] 4,355,911
[45] Oct. 26, 1982

[54] SURFACE TEMPERATURE SENSING DEVICE

[76] Inventor: John Tymkewicz, c/o Marlin Manufacturing Corp., 12404 Triskett Rd., Cleveland, Ohio 44111

[21] Appl. No.: 185,508

[22] Filed: Sep. 9, 1980

[51] Int. Cl.³ .......................... G01K 1/16; G01K 7/04
[52] U.S. Cl. .................................... 374/165; 136/233; 219/516; 374/179; 374/208
[58] Field of Search ................. 73/359 R, 352, 362.8; 219/450; 338/28; 136/233

[56] References Cited

U.S. PATENT DOCUMENTS

| 3,321,974 | 5/1967 | Sterbutzel | 73/359 R |
| 3,415,448 | 12/1968 | Williams et al. | 73/341 X |
| 3,690,176 | 9/1972 | Connolly et al. | 73/351 |
| 3,875,799 | 4/1975 | Webster | 73/343 R |
| 3,905,239 | 9/1975 | Legille | 73/343 R X |
| 3,934,477 | 1/1976 | Thetty | 73/362.8 |
| 3,952,596 | 4/1976 | Patel | 73/343 R X |
| 4,241,289 | 12/1980 | Bowling | 73/362.8 X |
| 4,265,117 | 5/1981 | Thoma et al. | 338/28 X |

Primary Examiner—Daniel M. Yasich
Attorney, Agent, or Firm—Frank B. Robb

[57] ABSTRACT

A temperature sensing probe device having an elongated tubular handle or arm at the end of which a probe head member is mounted in a socket to provide limited universal movement and including a small flat ring-like surface to be positioned on and assuring excellent contact with the surface at which the temperature is to be determined, the head member being constructed of relatively thin material arranged as a composite assembly to reduce the mass thereof and assembled with thermal cementitious material.

8 Claims, 6 Drawing Figures

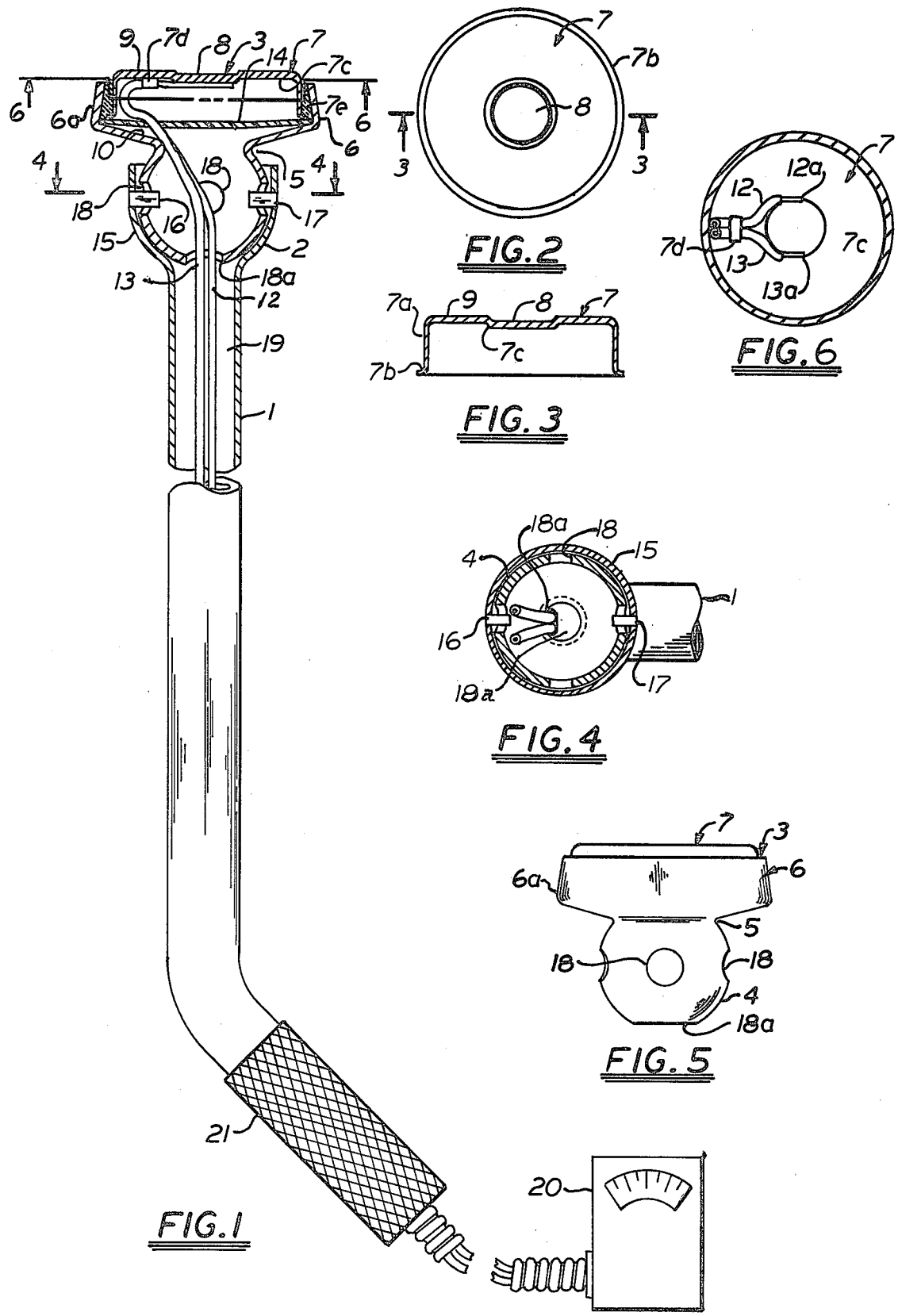

SURFACE TEMPERATURE SENSING DEVICE

BACKGROUND OF THE INVENTION

In various areas of the art of temperature sensing and recording, there are many occasions for determining the temperature of a surface or the like, which determination must be made periodically and should be made rapidly so that the advantage of the determination of the temperature can be incorporated in the use of the surface as for example in a cooking surface where the temperature is vital to proper and desired cooking results.

This is often the case where a griddle or like surface is to be brought up to temperature for cooking various types of products and thus it is desirable to determine quickly and reliably the actual temperature at any given area so that the use of the surface for the purpose will produce satisfactory results.

It is not intended by the foregoing that the concept hereof shall be limited to the foregoing, but that it is also desirable to ascertain surface temperatures in unrelated environments such as in connection with, molds, dies, bearings, pipe and building walls where information as to temperature is of value or required.

With the foregoing in mind therefore it is desirable to have an instrument which will make a temperature determination with accuracy and rapidly and without any particular skill being required to effect the temperature determination, and thus a hand held instrument having a surface which can be applied from most any position to the surface at which the temperature is to be determined, is a desired improvement and would be desirably available to those having the kinds of conditions which this sort of instrument would accommodate.

The instrument here of this invention is therefore intended to effect temperature determination with rapidity particularly because of the low mass of the sensing areas thereof and to translate the temperature to a recording or indicating device in very short periods of time, and thus by manipulation without any particular skill to provide a basis for use of the temperature determined surface with particular speed and advantage, so that consistent results may be obtained irrespective of the manner in which the instrument is held or used virtually under various circumstances.

The particular objects of the invention will thus be understood when it is explained that the instrument involves a hand held or fixed or otherwise positionable device having a handle or arm at the end of which a probe head member is positioned, the head member being arranged for limited universal application so that the angle with which the instrument is held for application of the temperature sensing surface of the device is not critical and produces results whether it is manipulated in the same way each time or not and whether it is at the same particular point or not, the angularity at which the contact is made being largely accommodated by the construction hereof.

The instrument itself involves a relatively long slender handle or arm at the end of which a suitable socket is provided and a probe head member which may preferably be of relatively small size to facilitate application to areas of limited size or to which access may be restricted. The probe head member is mounted in the socket so as to be movable within limits in a universal manner.

The probe head member includes a ball element having an extension at the end of which a contact section is formed. This contact section in turn includes a cup-shaped portion, upwardly open as disclosed in the drawing, which portion in turn has a contact member seated therein. The contact member is in the form of a cup part of a suitable size to be received in the cup-shaped portion referred to, in this instance being inverted for that purpose. The contact member is fastened in the position described by suitable thermally resistant cementitious material.

The cup part of the contact section just described includes in its exposed portion, a centrally relieved area which thus presents a surface of ring-like form for application to the surface at which the temperature reading is to be sensed.

The cup part is made of a relatively thin copper-nickel alloy which is connected to a thermocouple, RTD, thermister or equivalent sensing element, and having leads which are fastened to the underside thereof, and extend through the handle or arm to thereby transmit the necessary reaction to a meter or other recording device for reading.

The construction and arrangement of the respective parts is such that the application of the ring surface to the surface at which temperature is to be determined may be readily effected and the angularity with which it is directed thereby by the handle or arm is of relatively limited importance because of the universal movement of the head member.

The element leads, of small diameter, extend through the arm, are connected to the head and may be combined into a conductor or conductors having a spring-like action which in effect provides centering resiliency to the head member while protecting the leads through the arm or handle portion.

The various objects and advantages of the invention hereof, will be set forth in the appended specification and illustrated in the drawing wherein:

FIG. 2 is a fragmentary sectional or partially sectional view illustrating the invention in elevation.

FIG. 2 is a view showing one of the elements of the member, specifically the cup part in plan to draw attention to the ring-like configuration of the surface.

FIG. 3 is a sectional view about on the line 3—3 of FIG. 2 looking in the direction of the arrows.

FIG. 4 is a fragmentary sectional view taken about on the line 4—4 of FIG. 1 looking in the direction of the arrows.

FIGS. 5-6 are views of the head member.

DETAILED DESCRIPTION OF THE INVENTION

Referring now to FIG. 1, the invention hereof comprises an elongated arm or handle generally designated 1, having a socket at one end designated 2 and a probe head member generally designated 3 supported in the socket aforesaid.

The probe head member comprises a ball element 4, preferably of low thermal conductive material, as shown in FIG. 1 and as a separate unit therefrom in FIG. 5, being necked inwardly at 5 and there connected to and integral with a cup-shaped portion 6 as seen in FIGS. 1 and 5, the wall 6a of the part 6, being truncated, tapering upwardly and inwardly. The cup-shaped portion 6 is arranged to receive therewithin a cup part 7 formed of a copper nickel alloy or similar good thermal conductive material and including the flat surface at its exterior portion which in turn is formed with a central depression 8 so as to provide a ring-like surface 9 for purposes to be subsequently explained. The wall 7a of the part 7 is purposely thinner than the surface 9, the difference being exagerated for emphasis. The wall 7a that is of the part 7, terminates at its free end in a lip 7b for purposes to be subsequently set forth.

It is noted that this cup part 7 is inverted and placed in position in the cup-shaped portion 6, being spaced from the lowermost or bottom of the portion 6 designated 10, comprising a seat by a disc 14 of thermal insulating material which is of suitable size to be tightly positioned in the portion 6, and preferably of fiberglas or like composition the parts 6,7,8,9 and sub-tended numeral parts all constituting the extremity of member 3 and a contact section.

The cup part 7 is connected to the ends of certain leads 12 and 13, which extend downwardly through the head member 3. The leads 12 and 13 are connected by brazing or welding at their ends to the opposite areas of the depression 8 at 12a and 13a underneath the surface 9 and extend with a portion of the bare surface thereof, along the underside 7c of said ring-like surface, being held in position by a clip 7d which is in turn connected to the said underside. This arrangement provides excellent heat transfer to the leads and consequent rapidity and accuracy of temperature reading.

The leads 12 and 13 extend through the interior 19 of the arm 1, are enclosed in suitable material having good insulating characteristics and because of the material from which the leads are formed and the covering thereof, provides a resilient or spring-like action which is useful as will be explained further.

The cup part 7 is fixed in position within the cup-shaped portion by suitable cementitious material 7e which is thermally resistant and as shown in the drawing, the material is forced into the space between the inside of the wall 6a of the cup-shaped portion 6 and the outer side of the wall 7a of the cup part 7. The lip 7b which is seated against the disc 14, and the configuration of the cup-shaped part 6, confine the material and provide a mechanical as well as a sealing connection of the parts, when the material hardens.

The material 7e reduces heat transfer away from the cup part 7 and thus assists in increasing rapidity of response to temperature directed to the part 7 and the thermocouple leads connected thereto.

The thin construction of the wall 7a of the part 7 reduces the mass to be heated and thus response to temperature change takes place more quickly.

The head member 3, as shown, is arranged to have the ball 4 thereof positioned in the socket 15 formed at the extremity of the handle or arm 1 as indicated in FIG. 1, and permit rocking and rolling action of the head member 3 within the limits of the construction.

It is retained in the socket 15 by means of the pins such as 16 and 17 which extend from opposite sides of the socket, and are round, and into openings such as 18 formed in the ball element 4. The pins 16 and 17 are substantially smaller in diameter than the openings 18, thereby permitting relative movement between the ball 4 and the socket 15 with respect to those pins.

While there are only two pins required there are four openings formed in the ball element so as to lighten the same, to reduce the mass thereof. The bottom of the ball element, is formed with a suitable opening such as 18a to enable the threading of the thermocouple conductors through the same and permit the movement of the head member 3 in its limited universal action. The conductors 12 and 13 also pass through a suitable opening in disc 14 and the necked in area 5, and thence through the arm 1.

The handle or arm 1, being preferably hollow thus provides a space within which the thermocouple leads 12 and 13, may be entered and extending therefrom the leads are in turn, as indicated in FIG. 1, connected to a suitable meter or the like 20, in any preferred manner.

The handle or arm 1 is provided with a suitable gripping member 21 thus enabling the entire device to be manipulated such arm being bent where and if desired, or straight without limiting the use.

As a consequence of the manner in which the conductors extend within the arm 1, ball 4 and are connected to the cup part 7, as well as the composition of the covering and lead material, a resilient positioning of the probe head member 3 results, thereby assisting in maintaining the sensing surface 9 in contact with the surface at which temperature is to be determined.

It will thus be apparent that application of the surface 9 of the cup part 7 to a surface at which temperature is to be determined, can be effected with relatively little attention to the actual attitude of the same, as long as it is pressed suitably there against. Obviously the actual relationship of the handle or arm 1 with the head member 3 is such that the angle is relatively unimportant within obvious limits but at least it does not require precise positioning only a suitable amount of pressure to be applied thereto.

By reason of the fact that the head member is actually comprised of relatively light weight parts of thin section, the response to temperature change to which the same is applied will be virtually instantaneous and in turn transmitted to the meter accordingly.

Thus quick determination of temperature conditions can be made for certain surfaces to which the ring-like portion 9 is applied and obviously changes in temperature will similarly be readily effected and the head member accordingly affected thereby, with the transmission of the reaction through the leads being such that very little time need be wasted in determining the temperature conditions and at the same time a rugged instrument is provided which is not so sensitive to handling that it defeats the purpose of its intended use.

I claim:

1. A temperature sensing probe device comprising an arm having a socket at one end, a probe head member including a ball-like element mounted in said socket for limited universal movement, a contact section having a portion insulated from the ball-like element connected to the ball-like element and comprising the extremity of the head member, said contact section being positioned for engagement with an area where temperature is to be sensed by movement of said arm, and thermocouple leads connected to the contact section and extending through the arm to indicating means, the ball-like element and contact section being formed of relatively thin material to minimize the mass thereof and facilitate rapid temperature change response transmittal from the head member to the indicating means.

2. A device as claimed in claim 1, wherein the ball-like element is formed with a cup-shaped portion including a seat, said contact section is formed with a mating cup part having a flat surface for contact with a surface at which temperature is to be measured and a spaced lip, said cup part being positioned in inverted position with the cup-shaped portion, the thermocouple leads being connected to said cup part and extending to the indicating means aforesaid.

3. A device as claimed in claim 2, where in the cup part flat surface is formed with a central depression therein whereby to provide a ring-like contact area therearound, to engage with a surface as stated.

4. A device as claimed in claim 2, wherein the cup-shaped portion includes means against which the lip of the cup part is positioned, thermal insulating cementitious material being used to maintain the portion and part in fixed relation to each other for use in temperature determination.

5. A device as claimed in claim 2, wherein the cup part is secured in the cup-shaped portion by thermal insulating cement, whereby to minimize heat transfer to said portion.

6. A device as claimed in claim 2, wherein a spacer of insulating material is positioned between the lip of the cup part and the seat therefore formed in the cup-shaped portion.

7. A device as claimed in claim 2, wherein a spacer of insulating material is positioned between the cup part and the seat therefore formed in the cup-shaped portion, and the cup part is secured in the said portion by thermal insulating cement, said spacer further preventing the cement from entering the ball element.

8. A device as claimed in claim 1, wherein the thermocouple leads are conductors which are relatively spring-like, whereby the limited universal movement of the head member to which the leads are connected is resiliently resisted.

* * * * *